US006742697B2

(12) United States Patent
McTernan et al.

(10) Patent No.: US 6,742,697 B2
(45) Date of Patent: Jun. 1, 2004

(54) JOINING OF STRUCTURAL MEMBERS BY FRICTION PLUG WELDING (75) Inventors: Keith R. McTernan, Huntington Beach, CA (US); Douglas J. Waldron, Fountain Valley, CA (US); Ray Miryekta, Huntington Beach, CA (US)

(73) Assignee: The Boeing Company, Seattle, WA (US)

( * ) Notice: Subject to any disclaimer, the term of this patent is extended or adjusted under 35 U.S.C. 154(b) by 31 days.

(21) Appl. No.: 10/134,932

(22) Filed: Apr. 29, 2002

(65) Prior Publication Data
US 2003/0201306 A1 Oct. 30, 2003

(51) Int. Cl.[7] .......................... B23K 31/02; B23K 20/12
(52) U.S. Cl. ..................................... 228/112.1; 228/2.1
(58) Field of Search ................................ 228/112.1, 2.1

(56) References Cited

U.S. PATENT DOCUMENTS

| 3,477,115 | A | | 11/1969 | Martin et al. | |
| 3,580,793 | A | | 5/1971 | Hewitt | |
| 5,460,317 | A | | 10/1995 | Thomas et al. | |
| 5,971,252 | A | * | 10/1999 | Rosen et al. | 228/112.1 |
| 5,975,406 | A | * | 11/1999 | Mahoney et al. | 228/112.1 |
| 6,045,027 | A | * | 4/2000 | Rosen et al. | 228/112.1 |
| 6,051,325 | A | * | 4/2000 | Talwar et al. | 428/593 |
| 6,213,379 | B1 | | 4/2001 | Takeshita et al. | |
| 6,227,433 | B1 | | 5/2001 | Waldron et al. | |
| 6,230,958 | B1 | | 5/2001 | Coletta et al. | |
| 6,450,394 | B1 | * | 9/2002 | Wollaston et al. | 228/112.1 |
| 6,585,148 | B2 | * | 7/2003 | Aono et al. | 228/112.1 |
| 2002/0125297 | A1 | * | 9/2002 | Stol et al. | 228/112.1 |
| 2003/0075584 | A1 | * | 4/2003 | Sarik et al. | 228/2.1 |
| 2003/0085257 | A1 | * | 5/2003 | James et al. | 228/112.1 |
| 2003/0098336 | A1 | * | 5/2003 | Yamashita | 228/112.1 |
| 2003/0116608 | A1 | * | 6/2003 | Litwinski | 228/112.1 |

FOREIGN PATENT DOCUMENTS

| DE | 196 20 814 A | | 11/1997 |
| EP | 0602072 B1 | * | 6/1994 |
| JP | 11 179568 A | | 7/1999 |
| JP | 2001-259863 A | * | 9/2001 |
| WO | WO 98 04381 A | | 2/1998 |

* cited by examiner

Primary Examiner—L. Edmondson
(74) Attorney, Agent, or Firm—Alston & Bird LLP (57) ABSTRACT The method of manufacturing a structural assembly includes positioning a first structural member at least partially adjacent a second structural member to define an interface therebetween and inserting a rotating plug into the first and second structural members at the interface to thereby join the first structural member to the second structural member. The resulting friction plug weld provides a relatively strong joint between the structural members, requires less forming and machining time, and is compatible with single-sided tooling. Additionally, the friction plug weld is compatible with other joining methods, such as friction stir welding.

30 Claims, 5 Drawing Sheets

JOINING OF STRUCTURAL MEMBERS BY FRICTION PLUG WELDING

FIELD OF THE INVENTION

This invention relates to friction welding and, more specifically, to the joining of structural members by friction plug welding.

BACKGROUND OF THE INVENTION

Structural assemblies, such as those in the aerospace industry, are often constructed by joining structural members together. The structural members can be joined to one another by welding along the joint interface between the members or using fasteners, such as rivets, screws, or bolts. Oftentimes it is necessary to join structural members that have complex geometries or configurations that complicate the joining process. For example, when joining structural members having curvilinear configurations, it can be difficult to position and secure the members relative to one another while preventing gapping and maintaining the joint interface free of obstruction. Similarly, some structural members have configurations that restrict access to the joint interface between the members. For example, when joining a dome to a cylinder to form a tank or the exterior of an aerospace vehicle, such as a rocket or missile, it can be difficult to simultaneously support and secure both the inside and outside of the dome and cylinder.

Conventionally, when joining structural members having complex configurations and/or joint interfaces that are difficult to access, a built-up structure or tooling is constructed between the structural members to assist in positioning and securing the structural members while they are joined. For example, when joining a dome to a cylinder, one or more backing plates or other support members ("tooling") can be added to the cylinder and dome to facilitate positioning the dome on the cylinder and to support the joint interface between the structural members as they are joined. The tooling can then be removed after the structural members are joined. However, constructing the tooling requires labor, time, and materials, thus increasing the manufacturing cost of the structural assembly. Similarly, the removal of the tooling requires additional labor and machining time, which further increases the manufacturing cost. In some cases, it can be difficult or impossible to access and remove the tooling after the structural members have been joined, which can adversely affect the overall weight of the resulting structural assembly. Weight and strength are of critical concern in the aerospace industry.

In seeking to reduce manufacturing costs, other methods of joining structural members having complex configurations have been proposed. One such method involves using fasteners, such as rivets, to join the structural members together. However, because rivets generally require pre-drilled holes, joining structural members using rivets can be labor intensive and time consuming. In addition, the types of joint configurations that can be joined using rivets are limited since rivets require that the structural members overlap at the joint interface or a support member or backing plate overlaps each of the structural members. Rivets can also interfere with the process of forming a secondary weld joint along the joint interface between the structural members. More specifically, the rivets may not be entirely consumed in the weld joint, which can result in stress concentrations in the finished structural assembly that can reduce the fatigue strength of the assembly.

Thus, there remains a need for an improved method of joining structural. members to form structural assemblies. The method should be cost effective and should facilitate the joining of structural members having a variety of configurations, including structural members having complex configurations or joint interfaces that are difficult to access. The method should be effective regardless of whether the structural members overlap. Additionally, the method should be compatible with other joining methods, such as fusion welding techniques and friction stir welding methods.

SUMMARY OF THE INVENTION

The present invention provides a method for manufacturing a structural assembly. According to one embodiment of the present invention, the method includes the steps of positioning a first structural member at least partially adjacent a second structural member to define an interface therebetween. A rotating plug is then inserted into the first and second structural members at the interface to thereby join the first structural member to the second structural member. In one embodiment, the method of manufacturing includes drilling an aperture in at least one of the first and second structural members. The aperture is structured to receive the plug. In another embodiment, the plug is machined to predetermined dimensions before it is inserted into the first and second structural members. In another embodiment, at least one end of the plug is machined subsequent to inserting the plug so that the end of the plug is flush with the outer surface of the corresponding structural member. In another embodiment, the method includes forming an elongate weld joint between the first and second structural members along the interface and wherein the elongate weld joint at least partially consumes the plug. For example, according to one embodiment, the elongate weld joint is formed by inserting a rotating friction stir welding probe into the first and second structural members at the interface and moving the rotating friction stir welding probe through the first and second structural members along a path defined by the interface. In yet another embodiment, the method includes repeating the inserting step at positions along the interface. For example, according to one embodiment, a rotating plug is inserted at a position at least partially overlapping an existing plug. In still another embodiment, the method includes securing the structural assembly to other structural assemblies to form the frame of an aerospace vehicle.

According to another embodiment of the present invention, the method of manufacturing a structural assembly includes the steps of positioning a first structural member at least partially adjacent a second structural member to define an interface therebetween. A plug is positioned adjacent the outer surface of the first structural member. The plug is rotated, and, concurrently with the rotating step, is inserted into the first and second structural members. In one embodiment, the method of manufacturing includes drilling an aperture in at least one of the first and second structural members. The aperture is structured to receive the plug. In another embodiment, the plug is machined to predetermined dimensions before it is inserted into the first and second structural members. In another embodiment, at least one end of the plug is machined subsequent to inserting the plug so that the end of the plug is flush with the outer surface of the corresponding structural member. In another embodiment, the method includes forming an elongate weld joint between the first and second structural members along the interface and wherein the elongate weld joint at least partially consumes the plug. For example, according to one embodiment, the elongate weld joint is formed by inserting a rotating friction stir welding probe into the first and second structural members at the interface and moving the rotating friction stir welding probe through the first and second structural members along a path defined by the interface. In yet another embodiment, the method includes repeating the inserting step at positions along the interface. For example, according to one embodiment, a rotating plug is inserted at a position at least partially overlapping an existing plug. In still another embodiment, the method includes securing the structural assembly to other structural assemblies to form the frame of an aerospace vehicle.

The present invention also provides a structural assembly comprising a first structural member and a second structural member that is positioned at least partially adjacent to the first structural member so as to define an interface therebetween. At least one friction plug weld joint joins the first structural member to the second structural member. In one embodiment, the friction plug weld joint has a tapered configuration. In another embodiment, the first and second structural members comprise different materials. In another embodiment, the first and second structural members are formed of aluminum, aluminum alloys, titanium, titanium alloys, or steel alloys. In another embodiment, the friction plug weld joint at least partially comprises a material different from the material forming at least one of the first and second structural members. In another embodiment, at least one friction plug weld joint at least partially overlaps another friction plug weld joint. In another embodiment, the friction plug weld joint is perpendicularly disposed in relation to the interface. In yet another embodiment, the friction plug weld joint is angularly disposed in relation to the interface. In still another embodiment, an elongate weld joint joins the first and second structural members. For example, according to one embodiment, the elongate weld joint comprises an arc weld joint, a resistance weld joint, a gas weld joint, or a friction stir weld joint. According to another embodiment, the elongate weld joint at least partially consumes at least one friction plug weld joint The present invention also provides a structural assembly comprising a first structural member and a second structural member positioned at least partially adjacent to the first structural member so as to define an interface therebetween. At least one friction plug weld joint joins the first structural member to the second structural member and wherein the friction plug weld joint extends through the first structural member at the interface and at least partially into the second structural member. In one embodiment, the friction plug weld joint has a tapered configuration. In another embodiment, the first and second structural members comprise different materials. In another embodiment, the first and second structural members are formed of aluminum, aluminum alloys, titanium, titanium alloys, or steel alloys. In another embodiment, the friction plug weld joint at least partially comprises a material different from the material forming at least one of the first and second structural members. In another embodiment, at least one friction plug weld joint at least partially overlaps another friction plug weld joint. In another embodiment, the friction plug weld joint is perpendicularly disposed in relation to the interface. In yet another embodiment, the friction plug weld joint is angularly disposed in relation to the interface. In still another embodiment, an elongate weld joint joins the first and second structural members. For example, according to one embodiment, the elongate weld joint comprises an arc weld joint, a resistance weld joint, a gas weld joint, or a friction stir weld joint. According to another embodiment, the elongate weld joint at least partially consumes the at least one friction plug weld joint.

Accordingly, there has been provided a structural assembly and an associated method of manufacture allowing for the efficient joining of structural members. The method is cost effective and can be used to join structural members having a variety of configurations, including structural members having complex configurations or joint interfaces that are difficult to access. The method can be used regardless of whether the structural members overlap. Additionally, the method is compatible with other joining methods, such as fusion and friction stir welding techniques.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION OF THE INVENTION

The present invention now will be described more fully hereinafter with reference to the accompanying drawings, in which preferred and exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
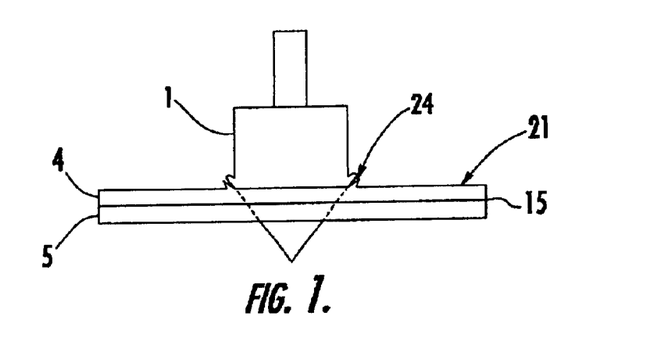
FIG. 1 is an elevation view illustrating a structural assembly formed by joining structural members with a friction plug weld, according to one embodiment of the present invention.
Figure 2:
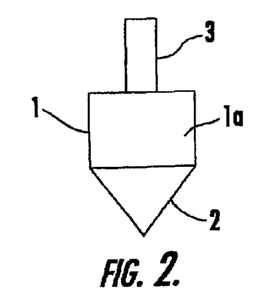
FIG. 2 is an elevation view illustrating a plug that has been machined to predetermined dimensions, according to one embodiment of the present invention.

Referring now to the drawings, and in particular to FIG. 1, there is illustrated a structural assembly 21, according to one embodiment of the present invention. The structural assembly 21 includes a friction plug weld 24 joining first and second structural members 4, 5 together. Referring to FIG. 2, there is illustrated a plug 1, according to one embodiment of the present invention, for forming the friction plug weld 24. The plug 1 can have a variety of configurations depending on the dimensions and configurations of the structural members to be welded. According to the embodiment illustrated in FIG. 2, the plug 1 has a cylindrical body 1a with a tapered end 2. In other embodiments, the end 2 of the plug 1 may be blunt or rounded. The plug 1 includes a shaft 3 that is structured to be attached to the spindle of a milling machine, drill or other device (not shown) for rotating the plug 1. Because the plug 1 is consumable, the plug 1 may be formed of a variety of metals and metal alloys depending on the materials used to form the structural members 4, 5, as discussed more fully below. For example, according to one embodiment, the plug 1 is formed of aluminum, aluminum alloys, titanium, titanium alloys, or steel alloys.

Figure 3:
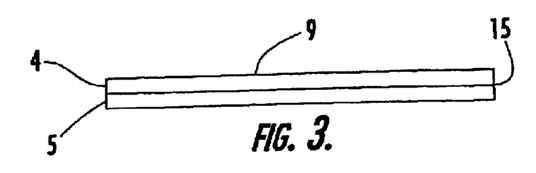
FIG. 3 is an elevation view illustrating two structural members positioned for joining, according to one embodiment of the present invention.

Referring to FIG. 3, there is illustrated the first and second structural members 4, 5 prior to being joined to form the structural assembly 21, according to one embodiment of the present invention. Each structural member 4, 5 can be machined, through known manufacturing means, from a single work piece into a predetermined shape and thickness as required by the specific design loads and specifications of the resulting structural assembly 21. For example, a CNC milling machine can be used to machine each structural member 4, 5, as necessary. The structural members 4, 5 can be manufactured in a variety of configurations, including, for purposes of example only and not limitation, plates, blocks, tubular members, and curvilinear members. Similarly, each structural member 4, 5 can be formed of a variety of materials, as required by the specific design loads and specifications of the resulting structural assembly 21. In addition, the number of structural members that can be joined together using the joining method of the present invention is not limited to two, but can include three or more structural members. According to another. embodiment (not shown), the ends of a single structural member can be joined together. The structural members 4, 5 preferably are formed of materials having high strength to weight ratios, including, for purposes of example only and not limitation, aluminum, aluminum alloys, titanium, titanium alloys, and steel alloys. At least a portion of the first structural member 4 is in contact with a portion of the second structural member 5 to thereby define an interface 15 between the first and second structural members 4, 5.

Figure 4:
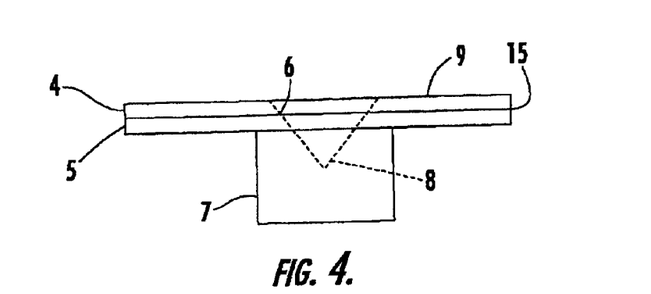
FIG. 4 is an elevation view illustrating the two structural members of FIG. 3 positioned on a support anvil prior to insertion of the plug of FIG. 2.

According to one embodiment of the present invention, one or both of the structural members 4, 5 can be prepped to receive the plug 1. For example, as illustrated in FIG. 4, one or more apertures 6 can be formed in one or both of the structural members 4, 5 using known manufacturing methods, such as drilling or punching. The dimensions and configuration of each aperture 6 are based on the dimensions and configuration of the plug 1, as well as the material properties and configurations of the structural members 4, 5. For example, the aperture 6 illustrated in FIG. 4 is tapered to match the angle of the end 2 of the plug 1 illustrated in FIG. 2. In other embodiments, the corresponding aperture 6 can be tapered more or less than the end 2 of the plug 1 or the aperture 6 can have no taper at all. Each aperture 6 preferably has dimensions at least slightly less than the dimensions of the plug 1 so that sufficient friction will be created between the plug and the structural members 4, 5. In other embodiments (not shown), no apertures are formed in the structural members 4, 5. For example, if the plug 1 has a relatively sharp end 2, or if the structural members 4, 5 are relatively thin or made of sufficiently soft materials, no apertures 6 may be necessary.

Figure 5:
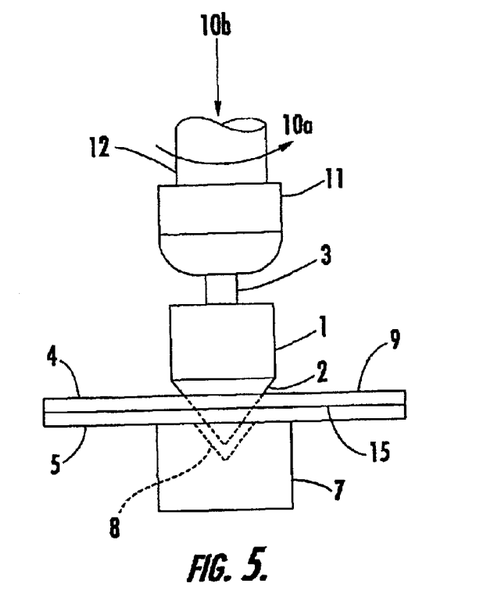
FIG. 5 is an elevation view illustrating the insertion of the plug of FIG. 2 into the two structural members of FIG. 3 using a rotating machine, according to one embodiment of the present invention.

Referring to FIG. 5, there is illustrated the insertion of the plug 1 into the structural members 4, 5 to form the friction plug weld 24. The shaft 3 of the plug 1 is attached to a rotatable spindle 12 using a chuck or collet 11. The rotatable spindle 12 is attached to a device, such as a drill or milling machine (not shown), that rotates the spindle to thereby rotate the plug 1, as indicated by the arrow 11a in FIG. 5. The rotatable spindle 12 preferably is also structured to urge the plug 1 through the first structural member 4 and interface 15 and at least partially into the second structural member 5.

Figure 6:
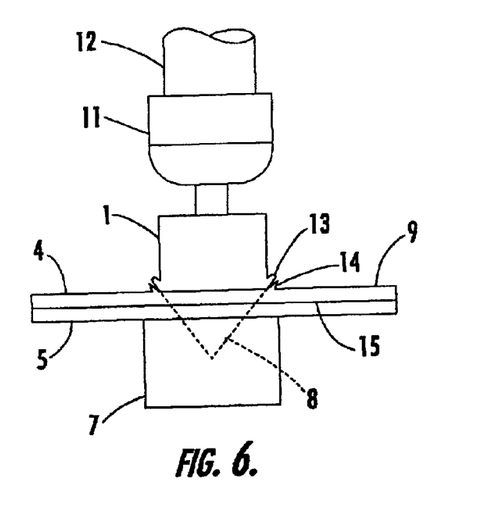
FIG. 6 is an elevation view illustrating the plug and structural members of FIG. 5 with the plug fully inserted into the structural members using the rotating machine, according to one embodiment of the present invention.

As illustrated in FIGS. 4–6, a backing plate or support anvil 7 can be positioned to support the first and second structural members 4, 5 during the friction plug welding process. According to one embodiment of the present invention, the anvil 7 defines a recess 8 having a configuration structured to receive the end 2 of the plug 1. For example, the recess 8 of the anvil 7 can be tapered to correspond to the end 2 of the plug 1. In other embodiments (not shown), the anvil 7 does not define a recess 8. In still other embodiments (not shown), no anvil 7 or backing plate is used, for example, where the structural members 4, 5 have sufficient strength or thickness to be self supporting.

Figure 10:
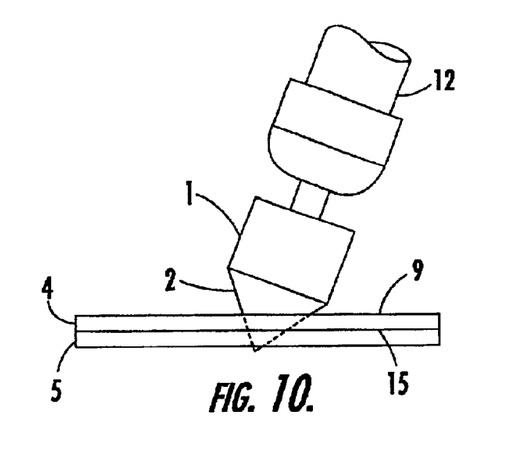
FIG. 10 is an elevation view illustrating a plug being inserted into two structural members so that the direction of the central axis of the plug forms an acute angle with a plane defined by the joint interface between the structural members, according to one embodiment of the present invention.
Figure 11:
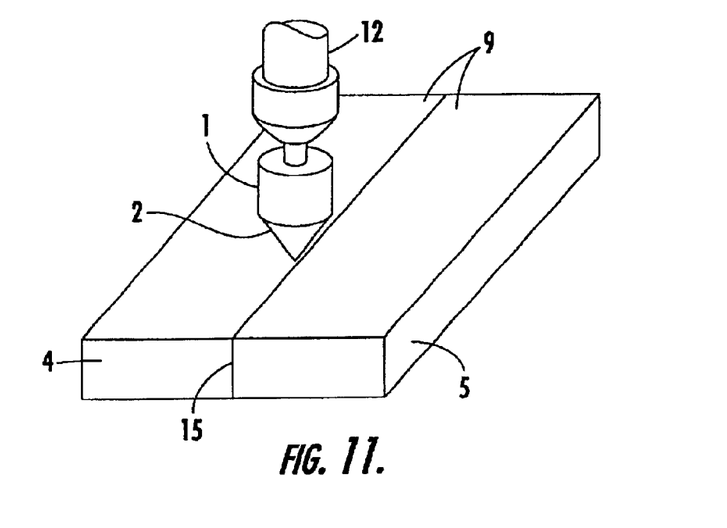
FIG. 11 is a perspective view illustrating two abutted structural members and a plug that is positioned for insertion into the structural members at the joint interface, according to one embodiment of the present invention.

As the rotating plug 1 is forced through the outer surface 9 of the first structural member 4, through the joint interface 15, and at least partially into the a second structural member 5, friction is generated between the plug 1 and the structural members 4, 5. The plug 1 can be inserted into the structural members 4, 5 perpendicular to the interface 15, as illustrated in FIG. 5, or at an angle to the interface 15, as illustrated in FIG. 10. Referring to FIG. 10, the longitudinal axis of the plug 1 forms an acute angle with the outer surface 9 of the first structural member 4 and the interface 15 between the structural members 4, 5. According to another embodiment of the present invention, the plug 1 is inserted along the interface 15 between the structural members 4, 5. For example, as illustrated in FIG. 1, a plug 1 is positioned for insertion into the structural members 4, 5 in a direction that lies within the plane of the interface 15. This method of joining the structural members 4, 5 is advantageous in some circumstances because the structural members 4, 5 do not need to overlap one another. Instead, the structural members 4, 5 can be positioned adjacent to one another and joined at the interface 15.

The friction generates sufficient heat energy to plasticize the plug 1 and the portions of the first and second structural members 4, 5 adjacent the plug. According to one embodiment, as illustrated in FIG. 5, the plug 1 is urged through the first and second structural members 4, 5. The support anvil 7 is positioned to support the first and second structural members 4, 5 against the force exerted by the plug 1 and so that the recess 8 of the anvil 7 receives the end 2 of the plug 1 as the plug exits the second structural member 5. Thereafter, as illustrated in FIG. 6, rotation of the spindle 12 is terminated so that the plug 1 ceases rotating. A friction plug weld 24 forms, joining the structural members 4, 5 together in a unitary structural assembly 21, as the plasticized regions 13, 14 of the plug 1 and structural members flow together and cool in the weld zone adjacent the exterior of the plug. The plasticized regions 13 of the plug 1 and the plasticized regions 14 of the first structural member 4 may form an area of flash or deformed material that can be removed by machining. According to one embodiment of the present invention, at least one end of the plug 1 is machined after the plug 1 is inserted into the structural members 4, 5 and the friction plug weld 24 is formed. The plug 1 can be machined, along with any flash 14 on the outer surfaces of the first and second structural members 4, 5, so that the end of the plug 1 is flush with the corresponding outer surface.

Figure 7:
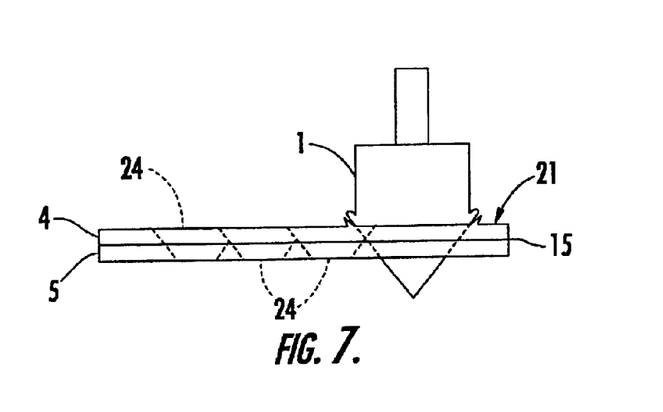
FIG. 7 is an elevation view illustrating two structural members that are joined by a plurality of friction plug welds, according to one embodiment of the present invention.
Figure 8:
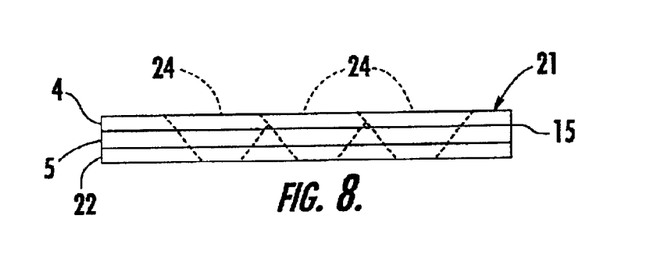
FIG. 8 is an elevation view illustrating two structural members that are joined by a plurality of friction plug welds, wherein each of the plug welds has been machined to be flush with the outer surfaces of the structural members, according to one embodiment of the present invention.
Figure 9:
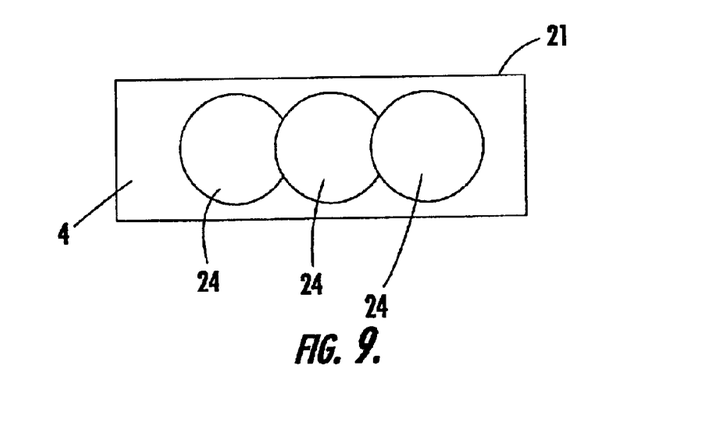
FIG. 9 is a top view of the friction plug welds of FIG. 8, illustrating the overlapping of the plug welds.

Referring to FIGS. 7–9, two or more plugs 1 can be inserted into the structural members 4, 5 along the interface 15 to further join the structural members. According to one embodiment, the plugs 1 are inserted along the interface 15 with predetermined spacing therebetween. According to another embodiment, the plugs 1 are inserted so that each plug 1 at least partially overlaps another plug 1. For example, as illustrated in FIG. 7, the structural members 4, 5 of the structural assembly 21 are joined by a plurality of friction plug welds 24 that have been machined on both ends to be flush with the outer surfaces of the structural assembly 21 and wherein each of the friction plug welds 24 overlaps at least one other friction plug weld 24. The process of overlapping friction plug welds 24 can be used to join the structural members 4, 5 along the entire length of the interface 15 or only a portion thereof.

While the figures illustrate structural assemblies 21 formed by two structural members 4, 5, as discussed above, the present invention also can be used to join three or more structural members to form the structural assembly 21 or to join two ends of a single structural member. One or more frictional plug welds 16 can be used to join the structural members, wherein each of the frictional plug welds 16 can join some or all of the structural members together.

Figure 12:
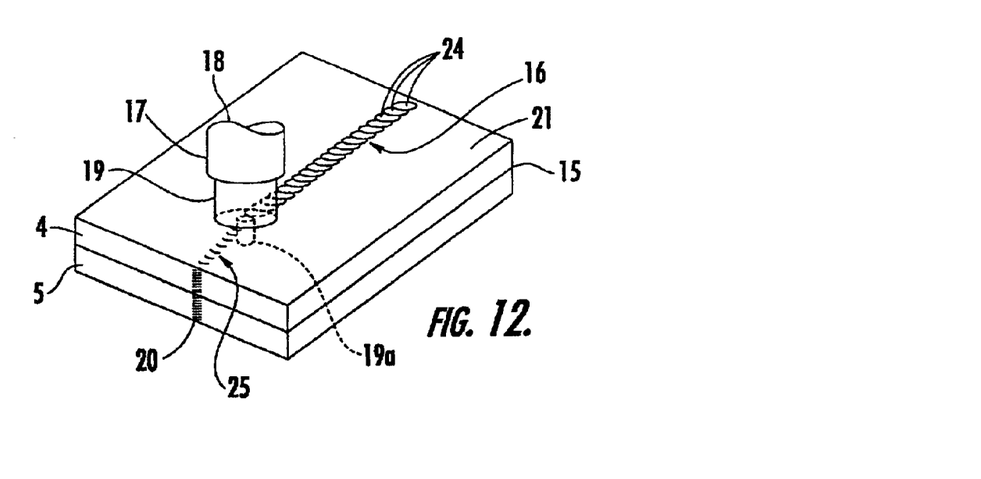
FIG. 12 is a perspective view illustrating the formation of an elongate friction stir weld joint that consumes existing friction plug welds, according to one embodiment of the present invention.

According to one advantageous embodiment of the present invention, as illustrated in FIG. 12, the friction plug welds 24 can be used to form a temporary weld 16, such as a tack weld, that temporarily positions and secures the structural members 4, 5 relative to one another so that a more permanent weld joint can be formed. As illustrated in FIG. 12, a friction stir welding tool 19 can then be used to form a more permanent elongate friction stir weld joint 20 that at least partially consumes the friction plug welds 24. Other types of elongate weld joints 25 can be formed according to other embodiments of the present invention (not shown), including, but not limited to, fusion welds, such as an arc weld joint, resistance weld joint, or gas weld joint The elongate weld joint 25 preferably at least partially consumes the one or more friction plug weld joints 24 of the temporary weld 16 and, more preferably, entirely consumes each of the friction plug weld joints. Advantageously, by entirely consuming the friction plug welds 24 of the temporary weld 16, the elongate weld joint 25 eliminates the stress concentrations associated with conventional rivets. In addition, even when the friction plug welds 24 of the temporary weld 16 are only partially consumed, the resulting stress concentrations are substantially decreased since, as discussed more fully below, the friction plug welds 24 formed according to the present invention have material properties substantially equal to, if not exceeding, those of the structural members 4, 5.

Friction stir welding is utilized to join structural members to form structural assemblies that can be used in the manufacture of military and commercial aircraft, as well as in other applications requiring high strength weld joints. As illustrated in FIG. 12, friction stir welding involves inserting the threaded pin 19a of a rotating friction stir welding tool 19 into the interface 15 between the opposing faces of a pair of structural members 4, 5 while urging the structural members 4, 5 together. The rotation of the threaded pin 19a in the interface 15 between the structural members 4, 5, or between the ends of a single structural member, creates friction that generates sufficient heat energy to plasticize the workpiece material in the weld zone. The friction stir welding tool 19 also includes a concave shoulder adapted to consolidate the plasticized workpiece material within the weld zone as the friction stir welding tool 19 is moved along the temporary weld 16. A friction stir weld joint 20 forms, joining the structural members 4, 5 together in a unitary assembly 21, as the plasticized regions of the structural members 4, 5 flow together and cool in the weld zone. See U.S. Pat. No. 5,460,317 to Thomas et al. for a general discussion of friction stir welding, the entire contents of which are incorporated herein by reference.

One particular benefit of friction stir welds 20 and friction plug welds 24 is that the formation of the weld is autogenous and is created by the solidification of the plasticized parent materials rather than a filler material, as is commonly used in conventional welding processes. The friction stir weld joint 20 or friction plug weld 24 comprises a nugget having a refined grain structure with grains having an equiaxed shape and grain sizes ranging in order of magnitude from approximately 0.0001 to 0.0002 inches (approximately 3 to 5 microns). As a result of the improved grain structure, the friction stir weld joint 20 and friction plug weld joints 24 resist the formation and propagation of micro-cracks and exhibit improved strength, ductility and toughness, as well as improved corrosion and fatigue resistance.

As discussed above, the structural members 4, 5 can be formed of either similar or dissimilar metals. Advantageously, in embodiments where the structural members 4, 5 are joined using just friction plug welds 24 or using friction plug welds 24 as a temporary weld joint 16 and an elongate friction stir weld 20 as a more permanent weld joint 25, the structural members can be formed of dissimilar metals that would be unweldable or uneconomical to join by conventional fusion welding techniques. Unweldable materials, when joined by conventional fusion welding techniques, produce relatively weak weld joints that tend to crack during weld solidification. Unweldable materials typically include aluminum and some aluminum alloys, particularly AA series 2000 and 7000 alloys. The use of friction stir welding and friction plug welding permits structural members 4, 5 formed of unweldable materials to be securely joined. Friction stir welding and friction plug welding also can be used to securely join weldable materials to other weldable and to unweldable materials. Thus, the method of the present invention permits the materials that form the structural members 4, 5 to be chosen from a wider variety of light weight, high strength metals and alloys, thereby facilitating reduction of the overall weight of the resulting structural assembly 21.

Figure 13:
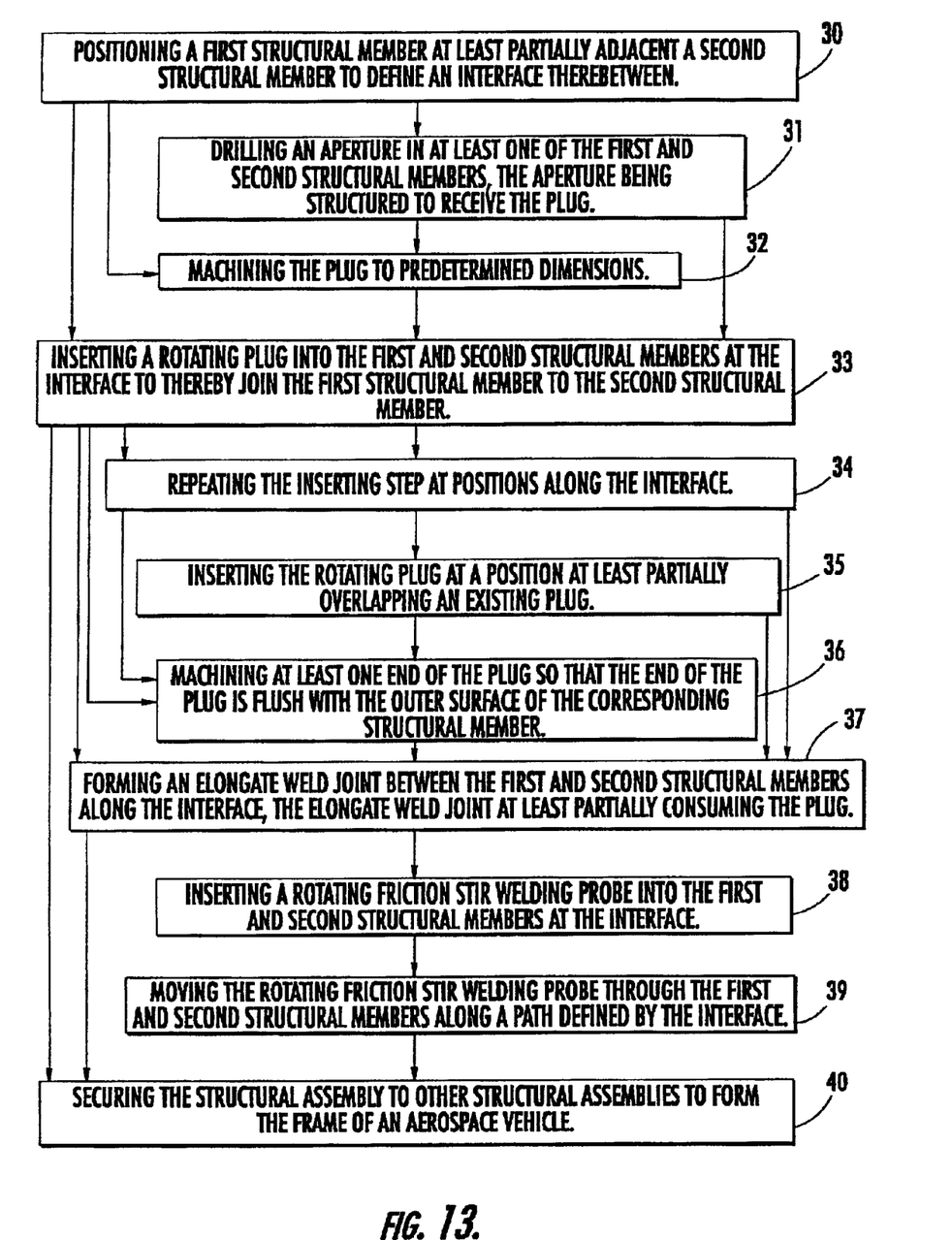
FIG. 13 is a flowchart illustrating a method for manufacturing a structural assembly, according to one embodiment of the present invention.

Referring now to FIG. 13, there is illustrated the operations performed to join structural members to manufacture a structural assembly 21, according to one embodiment of the present invention. The method includes positioning a first structural member at least partially adjacent a second structural member to thereby define an interface therebetween. See block 30. In one embodiment, the method includes drilling an aperture in at least one of the first and second structural members, the aperture being structured to receive a plug. See block 31. In another embodiment, the method includes machining the plug to predetermined dimensions. See block 32. A rotating plug is then inserted into the first and second structural members at the interface to thereby join the first structural member to the second structural member. See block 33. The inserting step can be repeated at positions along the interface to join the structural members using a plurality of friction plug welds. See block 34. For example, a plurality of friction plug welds can be used to tack weld the structural members together so that the structural members are securely positioned relative to one another as a more permanent weld joint is formed. According to one embodiment, at least one rotating plug is inserted at a position at least partially overlapping an existing plug. See block 35. At least one end of the plug is preferably machined so that the end of the plug is flush with the outer surface of the corresponding structural member. See block 36. For structural assemblies requiring a more permanent weld joint or a joint that is continuous, the method can include forming an elongate weld joint between the first and second structural members along the interface. See block 37. According to one embodiment, the elongate weld joint at least partially consumes the one or more plugs. For example, a rotating friction stir welding probe can be inserted into the first and second structural members at the interface. See block 38. The rotating friction stir welding probe is then moved through the first and second structural members along a path defined by the interface. See block 39. The method can then include securing the structural assembly to other structural assemblies to form the fame of an aerospace vehicle. See block 40.

Figure 14:
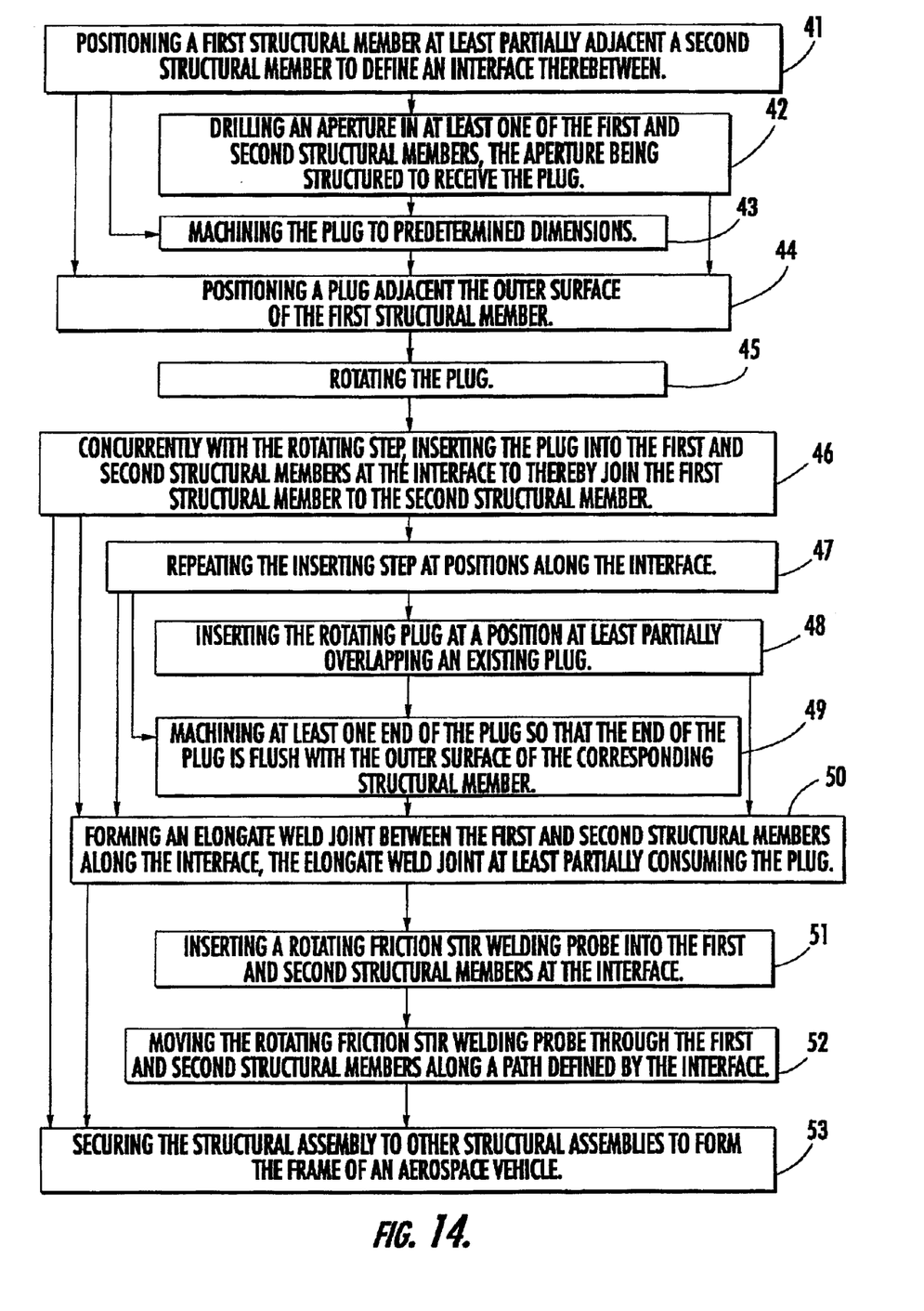
FIG. 14 is a flowchart illustrating a method for manufacturing a structural assembly, according to another embodiment of the present invention.

Referring now to FIG. 14, there is illustrated the operations performed to join structural members to manufacture a structural assembly, according to another embodiment of the present invention. The method includes positioning a first structural member at least partially adjacent a second structural member to thereby define an interface therebetween. See block 41. In one embodiment, the method includes drilling an aperture in at least one of the first and second structural members, the aperture being structured to receive a plug. See block 42. In another embodiment, the method includes machining the plug to predetermined dimensions. See block 43. A plug is then positioned adjacent the outer surface of the first structural member. See block 44. The plug is rotated. See block 45. Then, concurrently with the rotating step, the plug is inserted into the first and second structural members at the interface to thereby join the first structural member to the second structural member. See block 46. The inserting step can be repeated at positions along the interface to join the structural members using a plurality of friction plug welds. See block 47. For example, a plurality of friction plug welds can be used to tack weld the structural members together so that the structural members are securely positioned relative to one another as a more permanent weld joint is formed. According to one embodiment, at least one rotating plug is inserted at a position at least partially overlapping an existing plug. See block 48. At least one end of the plug is preferably machined so that the end of the plug is flush with the outer surface of the corresponding structural member. See block 49. For structural assemblies requiring a more permanent weld joint or a joint that is continuous, the method can include forming an elongate weld joint between the first and second structural members along the interface. See block 50. According to one embodiment, the elongate weld joint at least partially consumes the one or more plugs. For example, a rotating friction stir welding probe can be inserted into the first and second structural members at the interface. See block 51. The rotating friction stir welding probe is then moved through the first and second structural members along a path defined by the interface. See block 52. The method can then include securing the structural assembly to other structural assemblies to form the frame of an aerospace vehicle. See block 53.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of manufacturing a structural assembly, comprising:

positioning a first structural member at least partially adjacent a second structural member to define an interface therebetween;

inserting a rotating plug into the first and second structural members at the interface to thereby form a friction plug weld joint joining the first structural member to the second structural member; and thereafer forming an elongate weld joint between the first and second structural members along the interface, the elongate weld joint at least partially consuming the plug.

2. The method according to claim 1 further comprising drilling an aperture in at least one of the first and second structural members, the aperture being structured to receive the plug.

3. The method according to claim 1 further comprising machining the plug to predetermined dimensions prior to said inserting step.

4. The method according to claim 1 further comprising machining at least one end of the plug subsequent to said inserting step so that the end of the plug is flush with the outer surface of the corresponding structural member.

5. The method according to claim 1 wherein said forming step comprises:

inserting a rotating friction stir welding probe into the first and second structural members at the interface; and moving the rotating friction stir welding probe through the first and second structural members along a path defined by the interface.

6. The method according to claim 1 further comprising repeating said inserting step at positions along the interface.

7. The method according to claim 6 wherein said repeating step comprises inserting the rotating plug at a position at least partially overlapping an existing plug.

8. The method according to claim 1 further comprising securing the structural assembly to other structural assemblies to form the frame of an aerospace vehicle.

9. A method of manufacturing a structural assembly, comprising:
   positioning a first structural member at least partially adjacent a second structural member to define an interface therebetween;
   positioning a plug adjacent the outer surface of the first structural member;
   rotating the plug;
   concurrently with said rotating step, inserting the plug into the first and second structural members at the interface to thereby form a friction plus weld joint joining the first structural member to the second structural member; and
   thereafter forming an elongate weld joint between the first and second structural members along the interface, the elongate weld joint at least partially consuming the plug.

10. The method according to claim 9 further comprising drilling an aperture in at least one of the first and second structural members, the aperture being structured to receive the plug.

11. The method according to claim 9 further comprising machining the plug to predetermined dimensions prior to said second positioning step.

12. The method according to claim 9 further comprising machining at least one end of the plug subsequent to said inserting step so that the end of the plug is flush with the outer surface of the corresponding structural member.

13. The method according to claim 9 wherein said forming step comprises:
   inserting a rotating friction stir welding probe into the first and second structural members at the interface; and
   moving the rotating friction stir welding probe through the first and second structural members along a path defined by the interface.

14. The method according to claim 9 further comprising repeating said inserting step at positions along the interface.

15. The method according to claim 14 wherein said repeating step comprising inserting the rotating plug at a position at least partially overlapping an existing plug.

16. The method according to claim 9 further comprising securing the structural assembly to other structural assemblies to form the frame of an aerospace vehicle.

17. A method of manufacturing a structural assembly, comprising:
   positioning a first structural member at least partially adjacent a second structural member to define an interface therebetween;
   drilling an aperture in at least one of the first and second structural members, the aperture being structured to receive a plug;
   inserting the rotating plug into the first and second structural members at the interface to thereby form a fiction plug weld joint joining the first structural member to the second structural member; and
   thereafter forming an elongate weld joint between the first and second structural members along the interface, the elongate weld joint at least partially consuming the plug.

18. The method according to claim 17 further comprising machining the plug to predetermined dimensions prior to said inserting step.

19. The method according to claim 17 further comprising machining at least one end of the plug subsequent to said inserting step so that the end of the plug is flush with the outer surface of the corresponding structural member.

20. The method according to claim 17 wherein said forming step comprises:
   inserting a rotating friction stir welding probe into the first and second structural members at the interface; and
   moving the rotating friction stir welding probe through the first and second structural members along a path defined by the interface.

21. The method according to claim 17 further comprising repeating said inserting step at positions along the interface.

22. The method according to claim 21 wherein said repeating step comprises inserting the rotating plug at a position at least partially overlapping an existing plug.

23. The method according to claim 17 further comprising securing the structural assembly to other structural assemblies to form the frame of an aerospace vehicle.

24. A method of manufacturing a structural assembly, comprising: positioning a first structural member at least partially adjacent a second structural member to define an interface therebetween;
   drilling an aperture in at least one of the first and second structural members, the aperture being structured to receive a plug;
   positioning the plug adjacent the outer surface of the first structure member;
   rotating the plug;
   concurrently with said rotating step, inserting the plug into the first and second structural members at the interface to thereby form a friction plug weld joint joining the first structural member to the second structural member; and
   thereafter forming an elongate weld joint between the first and second structural members along the interface, the elongate weld joint at least partially consuming the plug.

25. The method according to claim 24 further comprising machining the plug to predetermined dimensions prior to said second positioning step.

26. The method according to claim 24 further comprising machining at least one end of the plug subsequent to said inserting step so that the end of the plug is flush with the outer surface of the corresponding structural member.

27. The method according to claim 24 wherein said forming step comprises:
   inserting a rotating friction stir welding probe into the first and second structural members, at the interface; and
   structural
   moving the rotating friction stir welding probe through the first and second structural members along a path defined by the interface.

28. The method according to claim 24 further comprising repeating said inserting step at positions along the interface.

29. The method according to claim 28 wherein said repeating step comprising inserting the rotating plug at a position at least partially overlapping an existing plug.

30. The method according to claim 24 further comprising securing the structural assembly to other strutural assemblies to form the frame of an aerospace vehicle.

* * * * *

UNITED STATES PATENT AND TRADEMARK OFFICE
CERTIFICATE OF CORRECTION

PATENT NO. : 6,742,697 B2  
DATED : June 1, 2004  
INVENTOR(S) : McTernan et al.

It is certified that error appears in the above-identified patent and that said Letters Patent is hereby corrected as shown below:

Column 12,  
Line 53, after "second structural members" cancel the ",";  
Line 54, cancel "structural".

Signed and Sealed this

Twenty-third Day of November, 2004

JON W. DUDAS  
*Director of the United States Patent and Trademark Office*